(12) United States Patent
Muff et al.

(10) Patent No.: US 8,443,027 B2
(45) Date of Patent: May 14, 2013

(54) IMPLEMENTING A FLOATING POINT WEIGHTED AVERAGE FUNCTION

(75) Inventors: Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 11/861,518

(22) Filed: Sep. 26, 2007

(65) Prior Publication Data
US 2009/0083357 A1    Mar. 26, 2009

(51) Int. Cl.
  *G06F 7/38* (2006.01)
(52) U.S. Cl.
  USPC .......................................... 708/445; 708/551
(58) Field of Classification Search .................. None
  See application file for complete search history.

(56) References Cited

U.S. PATENT DOCUMENTS

| | | | |
|---|---|---|---|
| 4,751,742 A * | 6/1988 | Meeker | 382/240 |
| 7,355,603 B2 * | 4/2008 | Donovan et al. | 345/582 |
| 2001/0055025 A1 * | 12/2001 | Deering et al. | 345/611 |

* cited by examiner

*Primary Examiner* — Michael D Yaary
(74) *Attorney, Agent, or Firm* — Patterson & Sheridan, LLP

(57) ABSTRACT

A method, computer-readable medium, and an apparatus for implementing a floating point weighted average function. The method includes receiving an input containing $2^N$ input values, $2^N$ weights, and an opcode, where N is a positive integer number and each of the input values corresponds to one of the weights. Furthermore, the method also includes using existing dot product circuit function to generate $2^N$ addends by multiplying each of the input values with the corresponding weight. In addition, the method includes generating a sum value by adding the $2^N$ addends, where the sum value includes an exponent value, and generating the weighted average value based on the sum value by decreasing the exponent value by N. In this fashion, the same circuit area may be used to carry out both dot product and weighted average calculations, leading to greater circuit area savings and performance advantages.

20 Claims, 8 Drawing Sheets

$$\frac{A_x B_x + A_y B_y + A_z B_z + A_w B_w}{4} = \text{MANTISSA} * 2^{\wedge}(\text{EXP}-2)$$

US 8,443,027 B2

IMPLEMENTING A FLOATING POINT WEIGHTED AVERAGE FUNCTION

BACKGROUND OF THE INVENTION

1. Field of the Invention

The present invention generally relates to performing calculations in a processor.

2. Description of the Related Art

The calculation of a floating point weighted average is required by many different hardware and software applications. One such application is full screen antialiasing (FSAA). Full screen antialiasing reduces the "jaggy" appearance of images where a lower than ideal screen resolution is used. There are also many other instances where a weighted average function is needed in computer graphics, such as triangle setup, or averaging the different components of phong lighting.

In existing floating point units such as those implementing the VMX instruction set or PowerPC scalar floating point instructions, computing a weighted average between the values involves several instructions with dependencies between them that stall the pipeline and can introduce performance problems. In addition, a number of temporary registers are consumed in the process. In certain implementations of vector floating point pipes that contain a dot product instruction such as the processor core used in the Xbox 360, implementing a weighted average function may be easier but still takes many cycles and consumes temporary registers in the process.

Accordingly, what is needed are an improved method, computer-readable medium, and apparatus for implementing a floating point weighted average function in a manner that is more efficient relative to prior art approaches.

SUMMARY OF THE INVENTION

One embodiment provides a method for generating a weighted average value. The method generally comprises receiving an input containing $2^N$ input values, $2^N$ weights, and an opcode, wherein N is a positive integer number and each of the input values corresponds to one of the weights, generating $2^N$ addends by multiplying each of the input values with the corresponding weight, generating a sum value by adding the $2^N$ addends, wherein the sum value includes a mantissa value and an exponent value, and generating the weighted average value based on the sum value by decreasing the exponent value by N.

One embodiment provides a method for generating a weighted average value. The method generally includes receiving an instruction containing four input values, four weights, and a weighted average opcode, generating four addends by multiplying each of the input values with a corresponding one of the weights, generating a sum value by adding the four addends, wherein the sum value includes a mantissa value and an exponent value, generating the weighted average value based on the sum value by decreasing the exponent value by two.

One embodiment provides a pipelined execution unit capable of producing a weighted average of $2^N$ operands, wherein N is an integer. The pipelined execution unit generally includes logic for multiplying each operand by a corresponding weight value to generate a plurality of addends, logic for summing the addends to generate a floating point product having a fractional portion and an original exponent portion, subtracting N from the exponent portion to produce a reduced exponent portion, and outputting the fractional portion and the reduced exponent portion as the weighted average.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
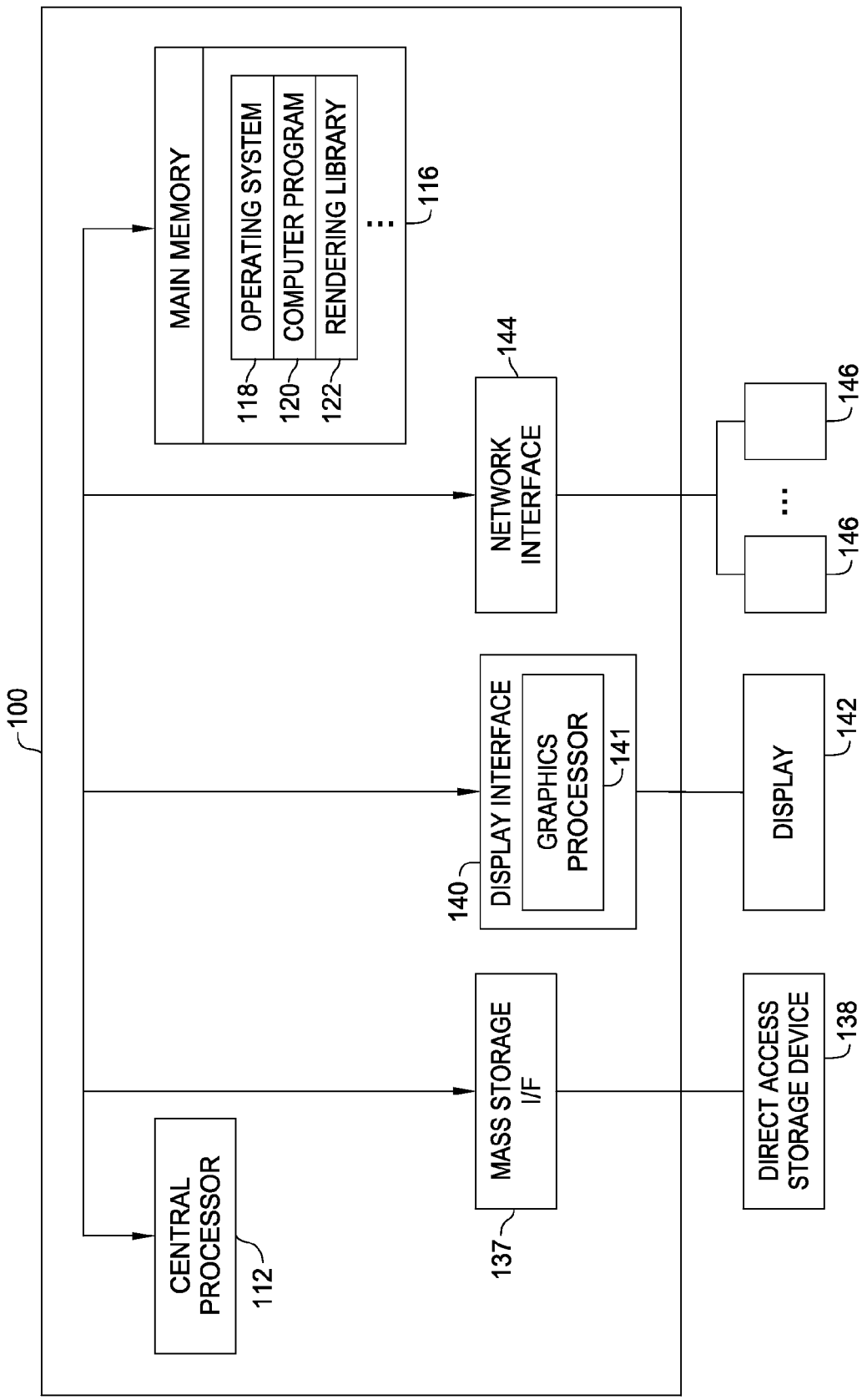
FIG. 1 is a block diagram depicting a computer system according to one embodiment of the invention.

The present invention generally provides a method, computer-readable medium, and apparatus for implementing a floating point weighted average function. A new vector floating point instruction is proposed that would operate on two vector source operands. The instruction would perform a weighted average of four floating point values by using the existing dot product circuit function to multiply each value to be averaged with its corresponding weight to generate four addends, and then adding the four addends together. The invention differs from the conventional dot product operation in that the final result exponent is decremented by 2 to effectively perform the division by 4 required to perform the average. As a result, the weighted average instruction takes less cycles to complete relative to the prior art approaches and does not require any temporary registers to hold intermediate values.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

System Overview

A particular system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

FIG. 1 depicts a computer system 100 according to one embodiment of the present invention. For purposes of the invention, computer system 100 may represent any type of computer, computer system or other programmable electronic device, including a client computer, a server computer, a portable computer, an embedded controller, a video game console, etc. The computer system 100 may be a standalone device or networked into a larger system.

The computer system 100 may include a mass storage interface (I/F) 137 operably connected to a direct access storage device 138, a display interface 140 operably connected to a display 142, and a network interface 144 operably connected to a plurality of networked devices 146. The display interface 140 may include a graphics processor 141. The display 142 may be any video output device for outputting a user interface. The networked devices 146 could be desktop or PC-based computers, workstations, network terminals, or other networked computer systems. The computer system 100 may also include at least one central processor 112, which obtains instructions, or operation codes (also known as opcodes) and data via a bus 114 from a main memory 116. The processor 112 could be any processor adapted to support the methods, apparatus and article of manufacture of the invention.

The main memory 116 could be one or a combination of memory devices, including Random Access Memory, non-volatile or backup memory (e.g., programmable or Flash memories, read-only memories, etc.). In addition, memory 116 may be considered to include memory physically located elsewhere in a computer system 100, for example, any storage capacity used as virtual memory or stored on a mass storage device or on another computer coupled to the computer system 100 via bus 114. The main memory 116 may include an operating system 118, a computer program 120, and a rendering library 122 which may be used to render graphics and perform other calculations for the computer program 120.

Figure 2:
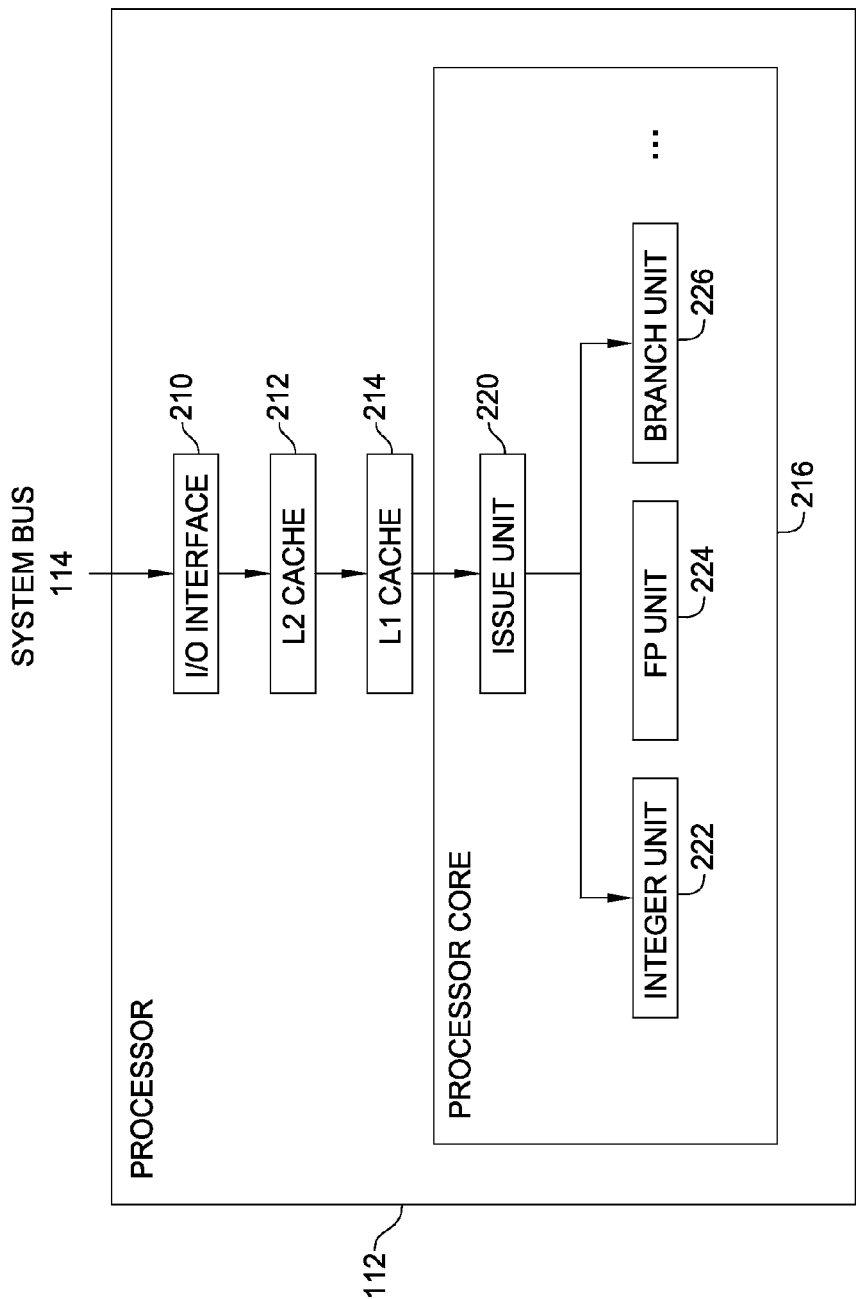
FIG. 2 is a block diagram depicting a processor according to one embodiment of the invention.

FIG. 2 is a block diagram depicting a processor 112 according to one embodiment of the invention. The processor 112 may include an input/output (I/O) interface 210 which sends and receives data via the system bus 114. The processor 112 may store a portion of the data being used by programs executed by the processor 112 in an L1 cache 214 and/or an L2 cache 212. Instructions executed by the processor 112 may be executed in a processor core 216 which may include an issue unit 220 for issuing instructions, an integer unit 222 for performing integer calculations, a floating point (FP) unit 224 for performing floating point calculations, a branch unit 226 for executing branch instructions, as well as other execution units. While described herein with respect to a single central processor 112 with a single processor core 216, embodiments of the invention may be utilized with any number of processors having one, two, or more processor cores 216.

Generating a Weighted Average Value

Embodiments of the invention provide a method, computer-readable medium, and apparatus for implementing a floating point weighted average function, for example, for performing a weighted average operation on four floating point values. As described below, embodiments may generate the weighted average value by implementing a new vector floating point instruction that would operate on received vector source operands. In one embodiment, by performing the weighted averaging as described below, the weighted average value may be obtained more quickly than other slower software methods for generating the weighted average value and with less hardware overhead than processors which utilize additional circuitry to generate the weighted average value.

In one embodiment, generating a weighted average value using the described method may be used by programs (e.g., program 120 and/or rendering library 122) in which obtaining the weighted average value quickly is desired. For example, embodiments of the invention may be used for fast rendering operations in programs such as video games. During the rendering operations, the weighted average value may be used for full screen antialiasing, triangle setup, and/or averaging the different components of phong lighting. Results of the rendering operations may then be displayed to a user, for example, using display 142. It is noted that embodiments of the invention may be used as an alternative to and/or in addition to other software methods and hardware methods of implementing floating point weighted average functions. Furthermore, embodiments of the invention may be utilized with any type of integrated circuit including the central processor 112 and/or the graphics processor 141 described above.

Figure 3:
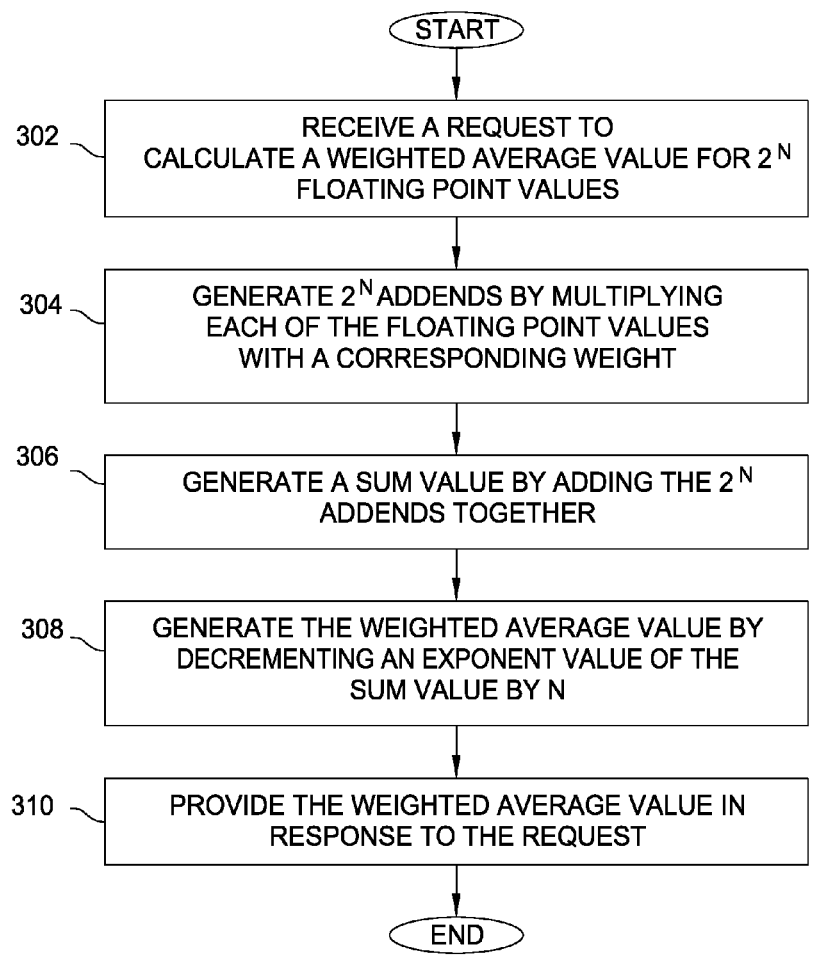
FIGS. 3 and 4 are block diagrams depicting processes for implementing a floating point weighted average function according to one embodiment of the invention.

FIG. 3 is a flow diagram depicting a process 300 for implementing a floating point weighted average function according to one embodiment of the invention. As depicted, the process 300 may begin at step 302, where a request to calculate a weighted average value for $2^N$ floating point values using $2^N$ weights is received, where N is a positive integer number and each of the floating point values corresponds to one of the weights. For example, the request may be an instruction executed by the processor 112 as part of the computer program 120 or rendering library 122. The instruction may include, for example, a vector weighted average instruction for a weighted average calculation on four floating point values.

At step 304, $2^N$ addends may be generated by multiplying each of the floating point values with the corresponding weight. At step 306, a sum value may be generated by adding the addends together. In one embodiment, the sum value may be presented in an exponential form with base equal to 2 as:

SUM VALUE=MANTISSA*2^EXPONENT

At step 308, the weighted average value may be generated based on the sum value by decrementing the exponent value of the sum value by N. At step 310, the weighted average value may be provided in response to the request. As described above, the weighted average value may be used, for example, during rendering operations for full screen antialiasing, triangle setup, and/or averaging the different components of phong lighting. Results of the rendering operations and/or physics calculations may then be displayed as a rendered image to a user, for example, using display 142.

Figure 4:
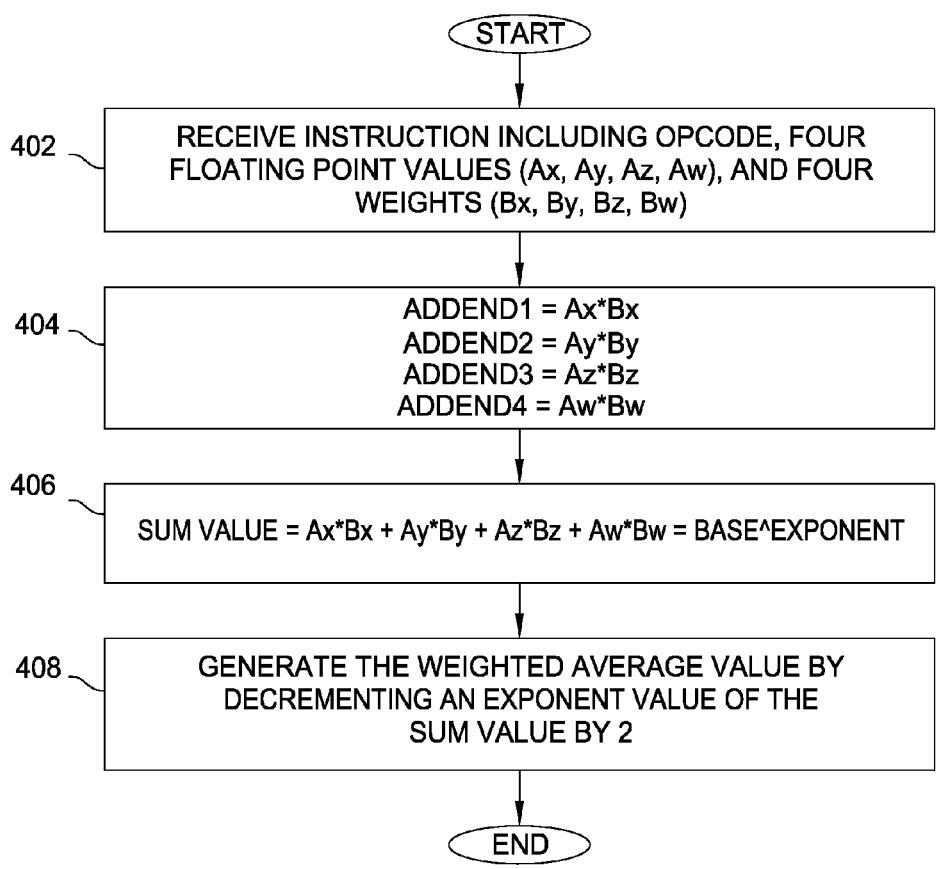

In general, the steps described above with respect to FIG. 3 for generating the weighted average value may be performed in any appropriate order and with any desired accuracy (e.g., in the number of bits of the floating point values and the weighted average value). For example, FIG. 4 is a flow diagram depicting a process 400 for implementing a floating point weighted average function according to one embodiment of the invention. When compared with implementing the floating point weighted average function using prior art methods, the method 400 described below may provide the weighted average value in less clock cycles and with less hardware overhead than processors which utilize additional circuitry to generate the weighted average value.

In one embodiment, the method 400 begins at step 402 where an instruction including an opcode, four floating point values ($A_x$, $A_y$, $A_z$, $A_w$), and four weights ($B_x$, $B_y$, $B_z$, $B_w$) is received. The four floating point values may comprise a first vector source operand, the four weights may comprise a second vector source operand, and the opcode may indicate that the two operands may be used to perform weighted average of the four floating point values by using the existing dot product circuit functionality. At step 404, using the existing dot product circuit function, four addends (ADDEND 1, ADDEND2, ADDEND3, ADDEND4) may be generated by multiplying each of the floating point values with the corresponding weight:

ADDEND1=$A_x B_x$

ADDEND2=$A_y B_y$

ADDEND3=$A_z B_z$

ADDEND4=$A_w B_w$

At step 406, using the existing dot product circuit function again, a sum value may be generated by adding the four addends together. In one embodiment, the sum value may be presented in an exponential form with base equal to 2 as:

SUM VALUE=$A_x B_x + A_y B_y + A_z B_z +$
$A_w B_w$=MANTISSA*2^EXPONENT

While the four addends are generated and added using the existing dot product circuit function, this invention differs from the conventional dot product operation in that the final result exponent is decremented by 2 to effectively perform the division by 4 required to compute the average. Therefore, at step 408, the weighted average (WAVG) value may be generated based on the sum value by decrementing the exponent value of the sum value by 2:

WAVG VALUE=MANTISSA*2^(EXPONENT−2)

In one embodiment of the invention, steps of the methods described above may be performed using any conventional processor. For example, each of the steps may be implemented using instructions executed by a conventional processor. Embodiments of the invention may also be utilized where one or more steps are performed using hardware circuitry designed specifically to carry out the one or more steps. Such hardware circuitry may be used, for example, in addition to conventional processor capabilities to generate the weighted average value.

The method described above may also be performed by a processor (e.g., central processor 112 or graphics processor 141) configured specifically to execute an instruction for performing the steps described above. The instruction may be referred to, for example, as VWAVG because the instruction may produce a weighted average floating point value for the vector source operands identified in the instruction.

As depicted below in Table 1, the new vector floating point instruction (denoted as VWAVG in Table 1) takes only seven cycles to complete, which is only one pass through an example seven-cycle pipeline. This is faster than both the existing vector dot product solutions and the existing scalar floating point solutions, and, in addition, does not require any temporary registers to hold intermediate values. Persons skilled in the art will recognize that while, in various embodiments, the pipeline may be of any length, using the new vector floating point instruction described herein still takes the same number of cycles to complete as does conventional dot product instruction.

TABLE 1

Timing diagram for the disclosed weighted average vector instruction.

| Cycle 1 | Cycle 2 | Cycle 3 | Cycle 4 | Cycle 5 | Cycle 6 | Cycle 7 | Cycle 8 |
|---------|---------|---------|---------|---------|---------|---------|---------|
| VWAVG   |         |         |         |         |         |         |         |
|         | VWAVG   |         |         |         |         |         |         |
|         |         | VWAVG   |         |         |         |         |         |
|         |         |         | VWAVG   |         |         |         |         |
|         |         |         |         | VWAVG   |         |         |         |
|         |         |         |         |         | VWAVG   |         |         |
|         |         |         |         |         |         | VWAVG   |         |
|         |         |         |         |         |         |         | (done)  |

Figure 5:
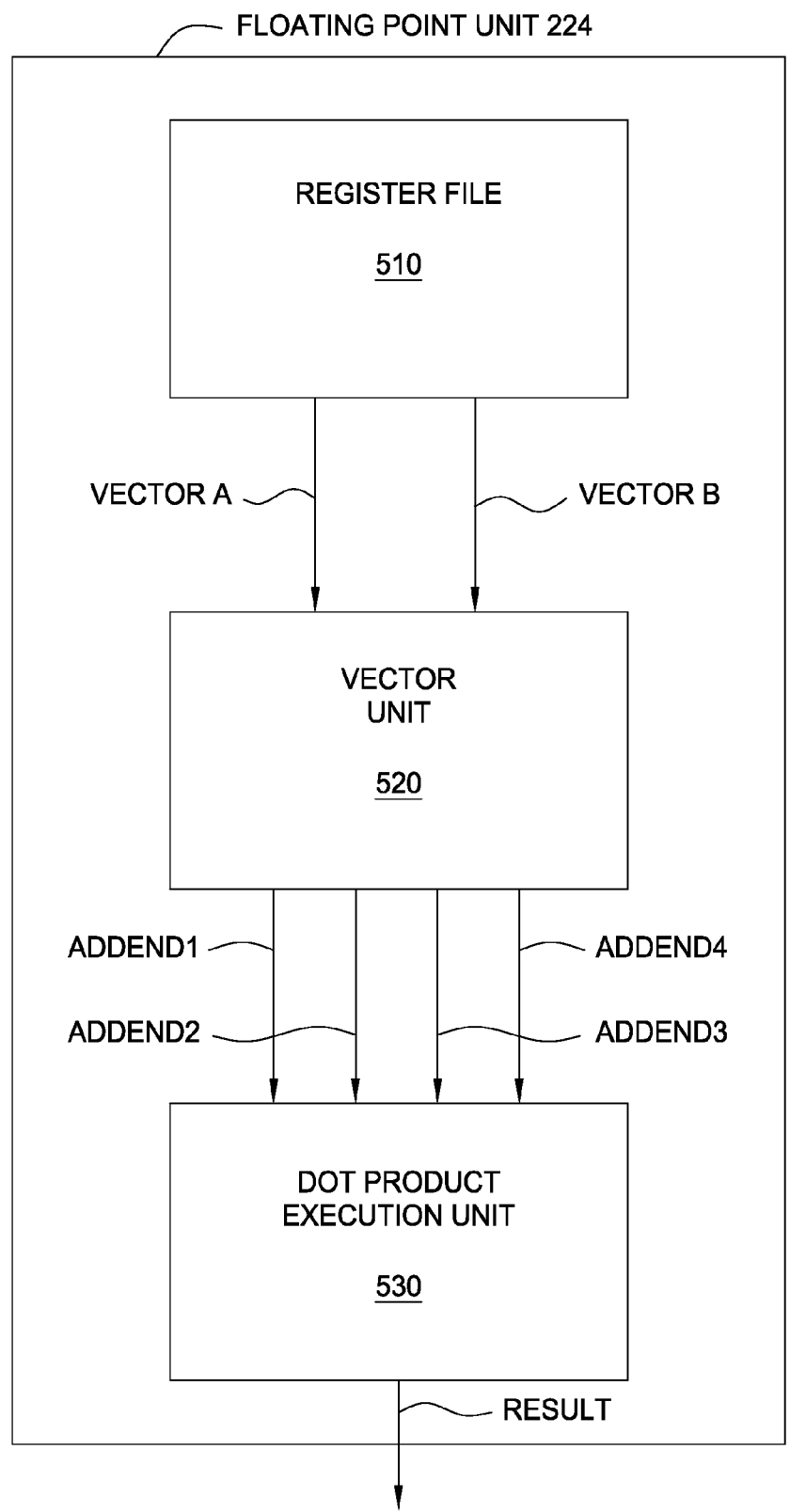
FIG. 5 is a block diagram depicting a floating point unit configured to implement a floating point weighted average function according to one embodiment of the invention.

In one embodiment of the invention, a pipeline within a floating point unit 224 may be modified to perform the steps described above in manner that provides increased execution performance with minimal additional hardware overhead. For example, FIG. 5 is a block diagram depicting a floating point unit configured to implement a floating point weighted average function according to one embodiment of the invention. As depicted, the floating point unit 224 may include a register file 510, a vector unit 520, and a dot product execution unit 530.

The register file 510 may be configured to store floating point values and weights. Thus, for example, the register file 510 may be used to store four floating point values $A_x$, $A_y$, $A_z$, and $A_w$, as a vector source operand A, and four corresponding weights $B_x$, $B_y$, $B_z$, and $B_w$, as a vector source operand B. When the instruction is executed, the vector source operands A and B flow from the register file 510 to the vector unit 520. The vector unit 520 may be configured to perform multiplication of the floating point values and the corresponding weights to generate the four addends described above. After the multiplication has been performed, the results of the multiplication may be sent to the dot product execution unit 530. The dot product execution unit 530 may be configured to align the four addends. At this point, the addends are summed together and normalized. Furthermore, the dot product execution unit 530 may decrement the exponent of the normalized summation result by 2 to implement the division by 4 required to perform the average of the four values.

Figure 6A:
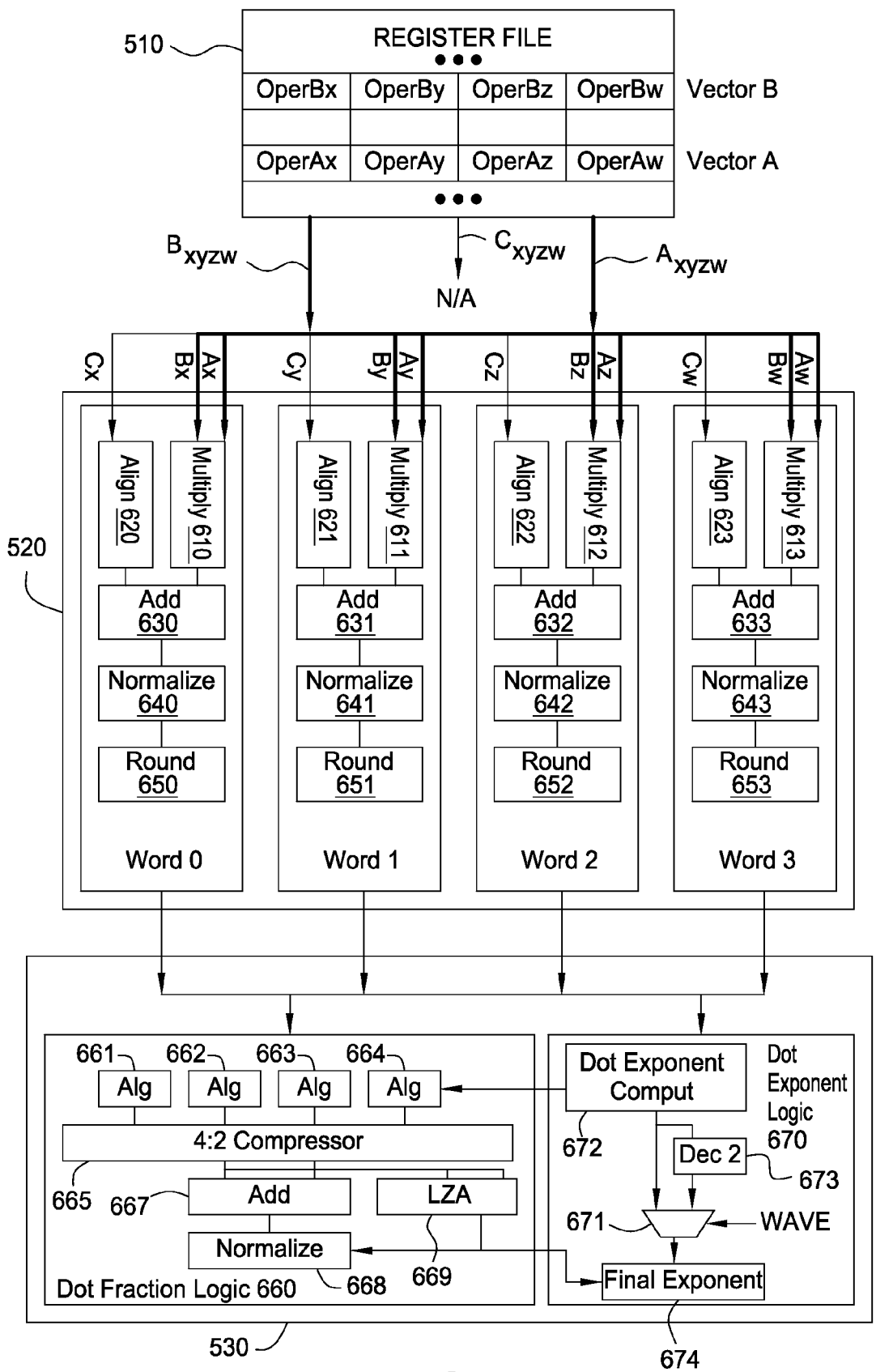
FIGS. 6A-6C are block diagrams depicting floating point weighted average flow according to one embodiment of the invention.
Figure 6B:
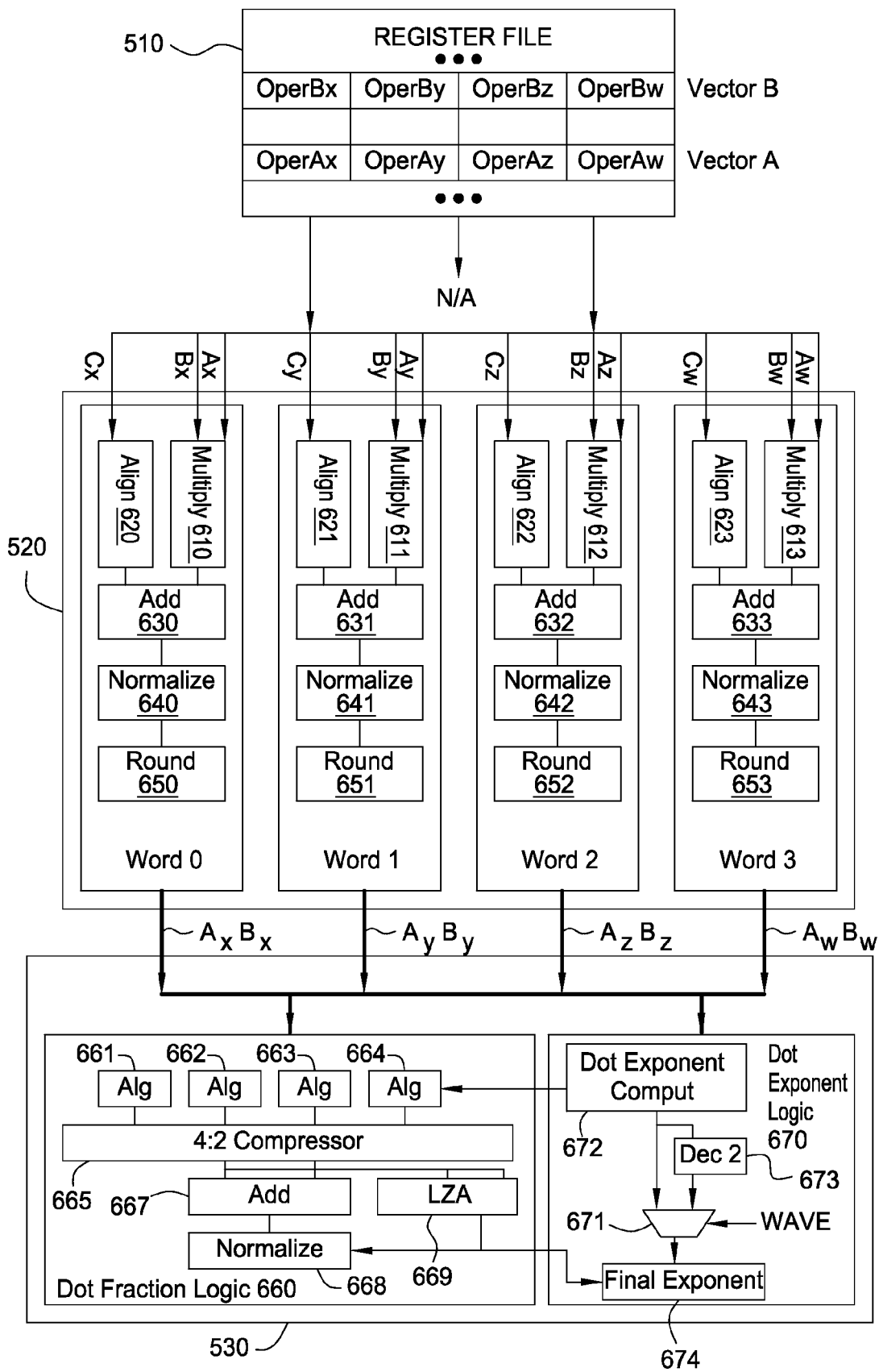
Figure 6C:
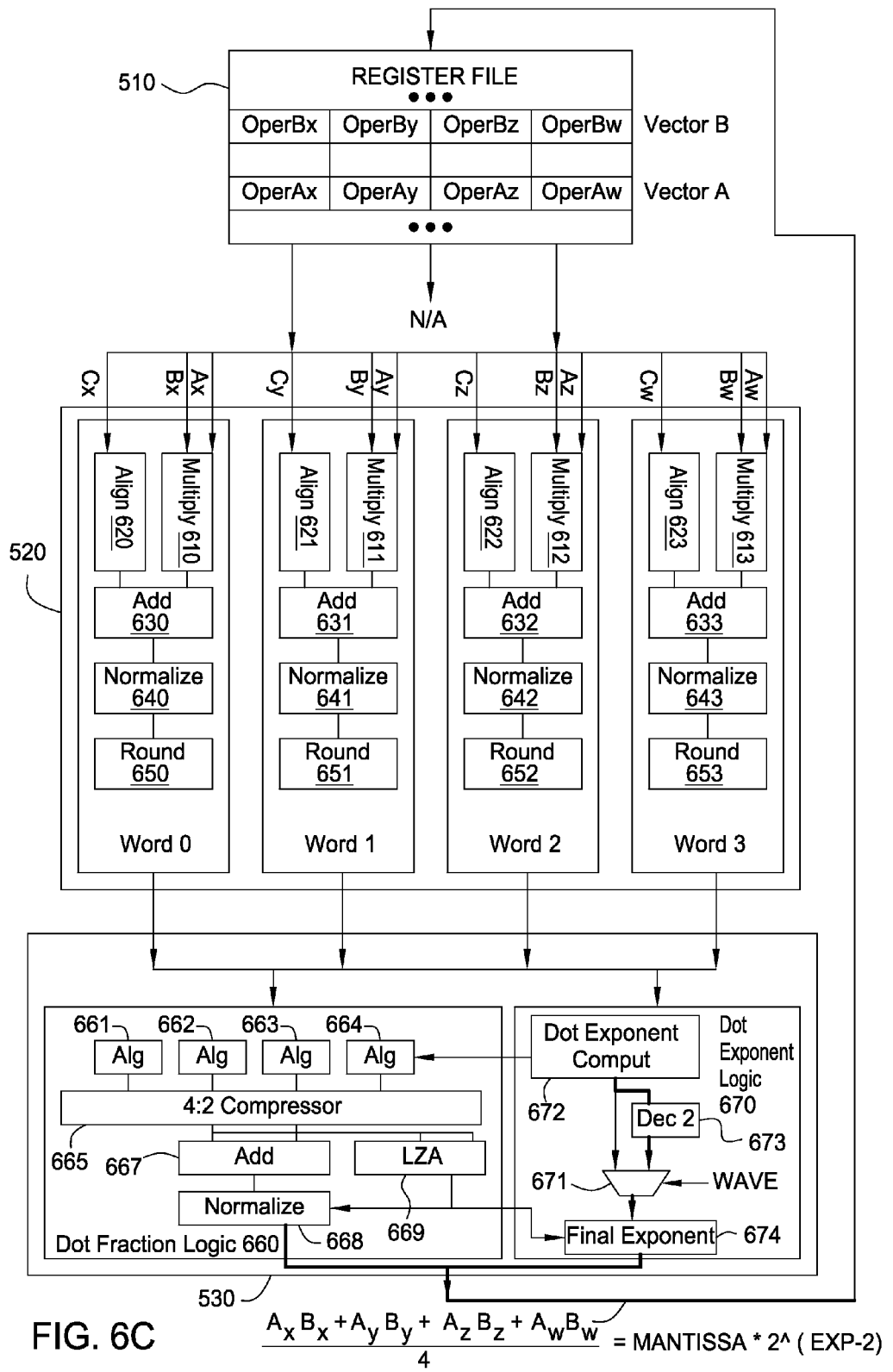

FIGS. 6A-6C are block diagrams depicting floating point weighted average flow according to one embodiment of the invention. Before the weighted average instruction is executed, four floating point values may be stored in the register file 510 as a vector source operand A (shown as $OperA_x$, $OperA_y$, $OperA_z$, and $OperA_w$). In addition, four weights may also be stored in the register file 510 as a vector source operand B (shown as $OperB_x$, $OperB_y$, $OperB_z$, and $OperB_w$). As shown in FIG. 6A, when the instruction is executed, the vector source operands A and B flow from the target locations in the register file 510 specified in the instruction to the vector unit 520. In one embodiment, all four lanes of the vector unit 520, shown as Word 0, Word 1, Word 2, and Word 3, may be used to process the four multiples. In such a case, multiply logic 610-613 may be configured to perform the multiplication of each of the floating point values and the corresponding weight. In one embodiment, align logic 620-623, add logic 630-633, normalize logic 640-643, and round logic 650-653 are included within the vector unit 520 for performing dot product calculations, but may remain unutilized when performing weighted average calculations.

After the multiplication is done, the results flow from the vector unit 520 to the dot product execution logic 530, as shown with addends $A_xB_x$, $A_yB_y$, $A_zB_z$, and $A_wB_w$ in FIG. 6B. In one embodiment, at the same time when the addends $A_xB_x$, $A_yB_y$, $A_zB_z$, and $A_wB_w$ leave the vector unit 520, new vector source operands corresponding to a new weighted average instruction may be entering the vector unit 520 from the register file 510.

The dot product execution logic 530 may include a dot fraction logic 660 and a dot exponent logic 670. The dot fraction logic 660 may be configured to align the addends using align units 661-664. At this point, the addends are summed together and normalized. In one embodiment, the addition of the addends may be performed with a 4:2 compressor 665 which compresses the four addends into a sum and carry vector and then uses an adder and a leading zero anticipator (LZA) 669 to add the final two values. Optionally, the adder may be implemented separately in the dot fraction logic 660, shown as an adder 667, for example, to improve timing of the addition operation. In some cases, as known to those skilled in the art, the 4:2 compressor 665 may also be simplified to a Boolean equivalent version based on the addends (e.g., ADDEND4) involved in the addition.

After the sum of the addends is obtained, the sum may be sent to a normalizer 668 to be normalized into a correct floating point value, for example, using information from the adder 667 and the LZA 669. The exponent of the normalized sum may then be decremented by 2 in the dot exponent logic 670. In one embodiment, the dot exponent logic 670 may include a multiplexer 671 configured to determine whether the instruction being executed is a dot product or weighted average instruction. When the instruction being executed is the dot product instruction, the normalized sum obtained in the dot fraction logic 660 is provided as a result at the output of the dot product execution unit 530 via final exponent unit 674. When, however, the instruction being executed is the weighted average instruction, a dot exponent computation unit 672 may instruct the final exponent unit 674 to decrement the exponent of the sum by 2, via decrement unit 673, to obtain the weighted average value.

The weighted average value may then be provided as an output from the floating point unit 224, for example, to be used in other calculations. In one embodiment, the weighted average value, $(A_xB_x+A_yB_y+A_zB_z+A_wB_w)/4$, may be provided to the register file 510, as shown in FIG. 6C. As described above, the weighted average value may be used, for example, during rendering operations for full screen anti-aliasing, triangle setup, and/or averaging the different components of phong lighting. Results of the rendering operations and/or physics calculations may then be displayed as a rendered image to a user, for example, using display 142.

While the foregoing is directed to embodiments of the present invention, other and further embodiments of the invention may be devised without departing from the basic scope thereof, and the scope thereof is determined by the claims that follow.

What is claimed is:

1. A method for generating a weighted average value, the method comprising:
    receiving at a vector unit an input containing $2^N$ input values, $2^N$ weights, and an opcode, wherein N is a positive integer and each of the input values corresponds to one of the weights, and wherein the vector unit is implemented in circuitry;
    generating $2^N$ addends in the vector unit by multiplying each of the input values with the corresponding weight;
    generating a sum value in a dot product execution unit by adding the $2^N$ addends, wherein the sum value includes a mantissa value and an exponent value, and wherein the dot product execution unit is implemented in circuitry; and
    generating the weighted average value based on the sum value in the dot product execution unit by decreasing the exponent value by N.

2. The method of claim 1, wherein the $2^N$ input values are floating point values.

3. The method of claim 1, wherein the $2^N$ input values comprise a first vector source operand, the $2^N$ weights comprise a second vector source operand, and the opcode indicates that the weighted average value is to be generated based on the first vector source operand and the second vector source operand.

4. The method of claim 1, wherein N is greater than 2.

5. The method of claim 1, further comprising:
    providing the exponent value and the exponent value decreased by N to a multiplexer.

6. The method of claim 5, further comprising:
    in response to detecting the opcode, generating a signal to control the multiplexer to output the exponent value decreased by N.

7. A method for generating a weighted average value, the method comprising:
    receiving at a vector unit an instruction containing four input values, four weights, and a weighted average opcode, wherein the vector unit is implemented in circuitry;
    generating four addends in the vector unit by multiplying each of the input values with a corresponding one of the weights;
    generating a sum value in a dot product execution unit by adding the four addends, wherein the sum value includes a mantissa value and an exponent value, and wherein the dot product execution unit is implemented in circuitry; and
    generating the weighted average value based on the sum value in the dot product execution unit by decreasing the exponent value by two.

8. The method of claim 7, wherein generating the sum value comprises compressing the four addends into a sum and carry vector and then adding the sum and the carry vector.

9. The method of claim 7, further comprising selecting a value by which the exponent value is to be decremented to generate the weighted average value.

10. The method of claim 7, further comprising:
    providing the exponent value and the exponent value decreased by two to a multiplexer.

11. The method of claim 10, further comprising:
    in response to detecting the weighted average opcode, generating a signal to control the multiplexer to output the exponent value decreased by two.

12. The method of claim 10, further comprising:
    in response to detecting an opcode other than a weighted average opcode, generating a signal to control the multiplexer to output the exponent value.

13. The method of claim 12, wherein the opcode other than a weighted average opcode comprises a dot product opcode.

14. A pipelined execution unit capable of producing a weighted average of $2^N$ operands, wherein N is an integer, the pipelined execution unit comprising:
    logic circuitry for multiplying each operand by a corresponding weight value to generate a plurality of addends;
    logic circuitry for summing the addends to generate a floating point product having a fractional portion and an original exponent portion;
    subtracting N from the exponent portion to produce a reduced exponent portion; and
    outputting the fractional portion and the reduced exponent portion as the weighted average.

15. The pipelined execution unit of claim 14, further comprising:
    a multiplexer to receive the original exponent portion and the reduced exponent portion; and
    a control input to select the reduced exponent portion as an output of the multiplexer when a weighted average instruction is being executed.

16. The pipelined execution unit of claim 15, wherein the control input selects the original exponent portion as an output of the multiplexer when a dot product instruction is being executed.

17. The pipelined execution unit of claim 14, wherein the $2^N$ operands are floating point values.

18. The pipelined execution unit of claim 14, wherein the $2^N$ operands comprise a first vector source operand, $2^N$ weight values corresponding to the $2^N$ operands comprise a second vector source operand, and an opcode indicates that the weighted average is to be generated based on the first vector source operand and the second vector source operand.

19. The pipelined execution unit of claim 14, wherein N is greater than 2.

20. The pipelined execution unit of claim 14, wherein the logic circuitry for summing the addends comprises logic circuitry for compressing the addends into a sum and carry vector and logic circuitry for adding the sum and the carry vector.

* * * * *